US007216120B2

(12) United States Patent
Yoshida et al.

(10) Patent No.: US 7,216,120 B2
(45) Date of Patent: May 8, 2007

(54) APPARATUS AND METHOD FOR COLLECTING INFORMATION FROM INFORMATION PROVIDING SERVER

(75) Inventors: Takeo Yoshida, Tokyo (JP); Naoki Yamada, Tokyo (JP); Fumio Kitagawa, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 439 days.

(21) Appl. No.: 10/327,965

(22) Filed: Dec. 26, 2002

(65) Prior Publication Data

US 2003/0126112 A1 Jul. 3, 2003

(30) Foreign Application Priority Data

Dec. 27, 2001 (JP) ............................ 2001-398338

(51) Int. Cl.
*G06F 17/30* (2006.01)

(52) U.S. Cl. .............................. 707/3; 707/9; 707/200

(58) Field of Classification Search .................... 707/3, 707/9, 200
See application file for complete search history.

(56) References Cited

U.S. PATENT DOCUMENTS 6,118,771 A * 9/2000 Tajika et al. ................ 370/328
6,408,297 B1 * 6/2002 Ohashi ........................ 707/10
6,718,391 B1 4/2004 Hirosawa et al.
6,742,141 B1 * 5/2004 Miller ......................... 714/26
6,925,476 B1 * 8/2005 Multer et al. ............... 707/200
6,928,458 B2 * 8/2005 Cedola et al. .............. 707/203
7,130,701 B1 * 10/2006 Wischinski .................. 700/65
2001/0044934 A1 * 11/2001 Hirai et al. .................... 717/11
2002/0138640 A1 * 9/2002 Raz et al. ................... 709/231

FOREIGN PATENT DOCUMENTS

JP 11-045257 A 2/1999
JP A-11-120190 4/1999
JP A-11-232302 8/1999
JP A-2001-350787 12/2001

* cited by examiner

*Primary Examiner*—Don Wong
*Assistant Examiner*—Hanh Thai
(74) *Attorney, Agent, or Firm*—Oliff & Berridge PLC

(57) ABSTRACT

An information collection apparatus working as an agent of a plurality of client terminals for collecting information from an information providing server. A plurality of requested-item lists are stored in the requested-item list table, one for each client terminal. Each requested-item list is composed of a plurality of requested-items identifying a plurality of information items to be obtained by each client terminal. An information manager, which has the function of a combining processor, combines the contents of a plurality of requested-item lists to create a collection list. The collection list is composed of a plurality of collection items identifying a plurality of information to be collected by the information collection apparatus. The collection list is stored in a collection list table. An information collection processor actively references the information providing server to check if information has been updated, based on the collection list. Updated latest information is collected in this way. The collected latest information is delivered to corresponding one or more client terminals.

12 Claims, 3 Drawing Sheets

20

50 52 54

| TERMINAL ID | HARDWARE ENVIRONMENT | | | | SOFTWARE ENVIRONMENT | | | |
|---|---|---|---|---|---|---|---|---|
| | MAKER | MACHINE TYPE | CPU | • • • | OS | BROWSER | INSTALLED APPLICATION | • • • |
| CL1 | COMPANY A | a - 1 | 1800MHz | | OS1 | E | AP1,AP3,AP4 | |
| CL2 | COMPANY A | a - 2 | 11.0GHz | | OS2 | E | AP1,AP2,AP5 | |
| CL3 | COMPANY B | B - 1 | C866MHz | | OS2 | N | AP1,AP3 | |
| | | | | | | | | |

21: REQUESTED-ITEM LIST

| TABLE UPDATE DATE/TIME→T3 | | | |
|---|---|---|---|
| OBJECT ID | INFORMATION NAME | UPDATE DATE/TIME | SEQUENCE NUMBER |
| 0001 | COMPANY A | T1 | ----------- |
| 0002 | COMPANY B | T2 | ----------- |
| 0011 | a-1 | T3 | ----------- |
| 0100 | OS1 | T4 | ----------- |
| 0101 | OS2 | T5 | ----------- |
| 0200 | N | T6 | ----------- |
| ⋮ | ⋮ | ⋮ | ⋮ |

Fig. 3

APPARATUS AND METHOD FOR COLLECTING INFORMATION FROM INFORMATION PROVIDING SERVER

BACKGROUND OF THE INVENTION

1. Field of the Invention

The present invention relates to an apparatus and method for collecting information, and more particularly to an apparatus and method for collecting updated latest information from an information providing server over a network (such as the Internet).

2. Description of the Related Art

Many service providers on the Internet provide a service that, when particular information is updated to the latest information, automatically delivers the latest information to a client over the Internet in response to a previously-received request from the client (client terminal). Some specific examples are given below.

A client user who wants to receive the above-described service is required to notify the service provider of identification information, such as his or her own mail address or IP address, in advance. Upon receiving this identification information, the service provider stores the information in a personal information database of the service provider as the delivery address. When the information requested by the client is updated, the information providing server references the deliver address information stored in the personal information database to automatically deliver the updated latest information to the client identified by the delivery address information. The information providing server also provides a service that converts the latest information to a data specification desired by a client.

A problem with the conventional information providing service is that, as more and more clients request to receive the service, the number of information transmission addresses increases. This increases the load on the information providing server.

SUMMARY OF THE INVENTION

It is an object of the present invention is to provide an apparatus and method for reducing the load on an information providing server.

It is another object of the present invention to provide an apparatus and method for efficiently collecting information.

In one aspect of the present invention, an information collection apparatus provided between an information providing server and a plurality of client terminals for collecting information from the information providing server for use by the plurality of client terminals comprises a collection list table in which a collection list is stored, wherein the collection list is created by combining a plurality of requested-items identifying a plurality of information items to be obtained by the plurality of client terminals and is composed of a plurality of collection items; and a collection processor that actively references the information providing server for checking if information corresponding to each collection item in the collection list has been updated and thus collects updated latest information corresponding to each collection item in the collection list.

With the above configuration, the collection list created by combining a plurality of requested-items to be obtained by a plurality of clients is stored in the collection list table. The collection processor actively collects updated latest information according to the collection list. Because the information collection apparatus collects the latest information required by the client system in one go, instead of each client individually obtaining the latest information, the efficiency is increased. Another advantage is that the information collection apparatus actively collects update information to reduce the load on the information providing server. The latest information is delivered to one or more corresponding client terminals.

Preferably, the information collection apparatus further comprises a requested-item list table in which a plurality of requested-item lists are stored, wherein each of the plurality of requested-item lists is created for each client terminal and composed of a plurality of requested-items identifying a plurality of information items requested by the client terminal; and a combining processor that combines contents of a plurality of requested-item lists stored in the requested-item list table to create the collection list to be stored in the collection list table.

In the above configuration, the requested-item list of each client terminal is composed of a plurality of requested-items (candidates for items to be received). A requested-item may be an item on the hardware or software of the client terminal. Each client terminal may store a requested-item list into the requested-item list table, or the information collection apparatus may investigate the requested-items of each client terminal to store the resulting items into the requested-item list table as a requested-item list. The combining processor reflects all or a part of the contents of each requested-item list on the collection list. In this case, if a plurality of requested-items with the same contents are included in a plurality of requested-item lists, the combining processor preferably combines them into one collection item.

In another aspect of the present invention, an information collection apparatus connected to an information providing server via a first network and connected to a plurality of client terminals via a second network for collecting information from the information providing server for use by the plurality of client terminals comprises a requested-item list table in which a plurality of requested-item lists of the plurality of client terminals are stored, each of the requested-item lists being composed of a plurality of requested-items identifying a plurality of information items to be obtained by each of the clients; a combining processor that combines contents of the plurality of requested-item lists, stored in the requested-item list table, to create a collection list, the collection list being composed of a plurality of collection items identifying a plurality of information to be collected by the information collection apparatus: a collection list table in which the collection list is stored; a collection processor that actively references the information providing server based on the collection list to collect updated latest information; and a delivery processor that delivers the collected latest information to one or more client terminals that want to receive the information.

BRIEF DESCRIPTION OF THE DRAWINGS

FIG. 2 is a diagram showing an example of the configuration of a requested-item list table shown in FIG. 1.

FIG. 3 is a diagram showing an example of the configuration of a collection list table shown in FIG. 1.

DESCRIPTION OF THE PREFERRED EMBODIMENTS

Figure 1:
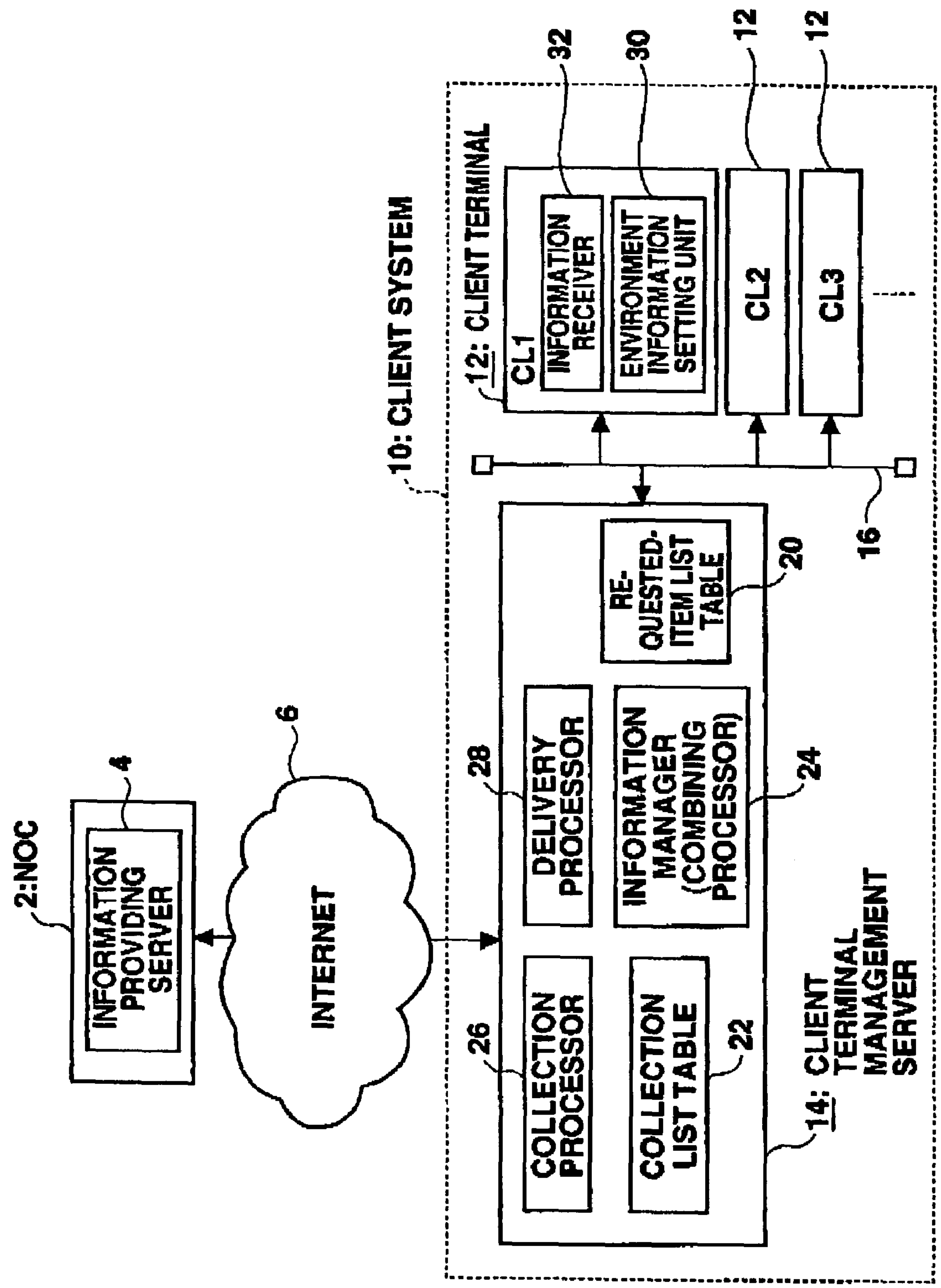
FIG. 1 is a block diagram illustrating a network system in a preferred embodiment of an information collection apparatus according to the present invention.

Some preferred embodiments of the present invention will be described with reference to the attached drawings.

FIG. 1 is a block diagram showing a network system including an information collection apparatus. Referring to FIG. 1, an NOC (Network Operation Center) 2 and a client system 10 are interconnected via the Internet 6 that is a first network. The NOC 2 has an information providing server 4 installed. The information providing server 4 manages and stores various types of information to be supplied to the client terminals 12 in the client system 10. The information providing server 4 may comprise one or more server machines.

The client system 10 comprises a plurality of client terminals 12 and a client terminal management server 14. The client terminal management server 14 corresponds to a DHCP (Dynamic Host Configuration Protocol) server that manages the addresses of the client terminals 12. In this embodiment, the client terminal management server 14 functions as an information collection apparatus (or an agent server for collecting information). The plurality of client terminals 12 and the client terminal management server 14 are interconnected via a LAN 16 that is a second network. That is, the client terminals 12 obtain necessary information (in particular, updated latest information corresponding to previously stored collection items) via the client terminal management server 14.

In this embodiment, the client terminal management server 14 has two types of table: requested-item list table (inquiry candidate list table) 20 and collection list table (inquiry target list table) 22. As will be shown in FIG. 2 later, a plurality of requested-item lists are stored in the requested-item list table 20, one for each client terminal 12. Each requested-item list is composed of a plurality of requested-items (information items) identifying a plurality of information items requested by (or associated with) the client terminal 12. Each requested-item list is acquired by sending a request from the client terminal management server 14 to the client terminal 12 or by sending the requested-item list from each client terminal. As will be shown in FIG. 3 later, a collection list created by combining a plurality of requested-item lists is stored in the collection list table 22. The collection list is composed of a plurality of collection items identifying a plurality of information items to be collected by the client terminal management server 14.

The client terminal management server 14 comprises an information manager 24, a collection processor 26, and a delivery processor 28, all of which access the two tables 20 and 22 described above.

The information manager 24 stores into, deletes from, and corrects data in the two tables 20 and 22 described above. The information manager 24 functions, in particular, as a combining processor. That is, it combines a plurality of requested-item lists into a single collection list. To do so, the information manager 24 combines a plurality of requested-items with the same contents, if any, into one collection item; The information manager 24 stores the collection list, created as a result of this combining processing, into the collection list table 22.

The collection processor 26 described above actively accesses the information providing server 4 to check if information on any of the collection items stored in the collection list table 22 has been updated. If the information has been updated, the collection processor 26 acquires the updated latest information from the information providing server 4. The latest information is, for example, information on various types of data and software. For example, the latest information may be information regarding the announcement, advertisement, or promotion of a new product or a new service or information regarding system maintenance, new versions, or version upgrading. As will be described later, the latest information may be encapsulated information or may include location identification information (URL) regarding updated (or newly provided) data or program modules.

The delivery processor 28 described above checks the requested-item list table 20 to identify one or more client terminals to which collected latest information is to be delivered, and delivers the latest information to those client terminals. Alternatively, the delivery processor 28 may provide latest information in response to a request from the client terminal 12.

On the other hand, the client terminal 12 has an environment information setting unit 30. The environment information setting unit 30 investigates a plurality of hardware and software items (requested-items) of the corresponding client terminal 12. The environment information setting unit 30 sends those plurality of items to the client terminal management server 14 to write them into the requested-item list table 20 as a requested-item list. The client terminal 12 also has an information receiver 32 that receives latest information from the client terminal management server 14.

The processors 24, 26, 28, 30, and 32 shown in FIG. 1 are implemented as software modules running on a computer. The two tables 22 and 24 may be built on separate storage units or on the same storage unit. In FIG. 1, general devices such as communication modules or input/output devices are omitted. ALAN 16 may be built in an organization such as a company or may be the Internet.

FIG. 2 is a diagram showing an example of the data configuration of the requested-item list table 20 shown in FIG. 1. The requested-item list table 20 contains a requested-item list 21 for each client terminal. More specifically, the items are classified roughly into a hardware environment item group 52 and a software environment item group 54 for each terminal ID 50. The hardware information item group 52 includes items such as a terminal maker name, terminal type, the type or performance of the CPU in the terminal the capacity of physical memory, current capacity of free memory, physical capacity of hard disk, current capacity of hard disk free space, network connection environment, monitor type, and so on. The software environment item group 54 includes items such as the OS name, WWW browser software name, application software name (word processing software, spreadsheet software program, etc.).

Many system environment items, if stored in the table 20 as described above, allow the client terminal 12 to automatically acquire updated latest information regarding hardware and software (for example, latest information or latest software modules supplied by the maker as necessary) immediately after those items are updated. Therefore, this table keeps the system environment of the client terminal 12 in the best condition and provides the user of the client terminal 12 with useful information.

FIG. 3 is a diagram showing an example of the data configuration of the collection list table 22 shown in FIG. 1. The collection list table 22 contains a table update time (ex. year/date/time) 56. The collection list table 22 also contains a collection list composed of a plurality of collection items. More specifically, each collection item corresponds to an object ID 58 or an information name 60. Each collection item is associated with an update time (ex. year/date/time) 62 and a sequence number 64.

The table update date/time 56 described above is table update data indicating the time at which the collection list table was last updated (or a time at which collection processing was last executed). The table update data may be a sequence number assigned at table update time. When collection processing is executed, the table update data is referenced as the base data used to check if information on each collection item has been updated. That is, only information updated after the table update time is collected as latest information in this embodiment. This allows a client to efficiently acquire and judge the latest information. The table update time 56 is updated after collection processing is executed.

The update time 62 and the sequence number 64 described above are individual update data (individual management data) for each collection item in the client side. The update time 62 and the sequence number 64 are updated when the corresponding latest information is acquired. The update time 62 maybe a time at which the client terminal management server 14 acquired the latest information or a time at which the information providing server 4 updated the latest information (that is, a copy of update time managed by the server side). Like the time information, the sequence number 64 is also data used to judge which update time is later.

In this embodiment, the information items to be obtained by the client terminal 12 are combined on the client terminal management server 14 and the client terminal management server 14 actively collects information as described above. This method eliminates the need for the information providing server 4 to deliver individual information to each of the plurality of client terminals 12 and thus reduces the load required for delivery processing. Another advantage is that the personal information on the client terminal 12 is not sent to an external unit and therefore security is better guaranteed.

Next, the operation of the system shown in FIG. 1 will be described In detail.

In this embodiment, each client terminal 12 may write into the requested-item list table 20. More specifically, the environment information setting unit 30 of the client terminal 12 accesses the requested-item list table 20 and sets the hardware and software information items described above (information items on its own system environment) in the requested-item list table 20. For example, if the client wants to automatically obtain upgrade information on the devices or the OS, the items indicating the devices or the Os are stored in the requested-item list table 20.

More specifically, the environment information setting unit 30 is configured as an instance (software module) that investigates the hardware and software specifications and stores their current status. This instance automatically executes the investigation at a predetermined time (at a system startup time or at a predetermined interval) and sends the investigation result (that is, requested-item list) into the requested-item list table 20. Alternatively, the user may specify information items as the items to be obtained. The items to be investigated may include items not associated with hardware and software.

The information manager 24 of the client terminal management server 14 combines the contents of the requested-item list table 20 at a predetermined time (at the time of system startup or at some other predetermined time) and automatically selects a plurality of collection items. Those plurality of collection items form a collection list. The information manager 24 stores the collection list into the collection list table 22. If there is an item deleted from the requested-item list table 20, the information manager 24 also deletes that item from the requested-item list table 20. In this way, the contents of the requested-item list table 20 are reflected in the contents of the collection list table at an interval of a predetermined time.

A plurality of items concerning the client terminal management server 14 may also be stored in the collection list table 22 assuming that the client terminal management server 14 itself is one of the client terminals in the client system 10.

The information providing server 4 manages various types of information. Among them are various types of information regarding the hardware and the software. Examples of this information include OS patch information and new business module information. The information providing server 4 manages the update time (and/or sequence number) of each piece of information as individual update data (individual management data).

The collection processor 26 sends an inquiry to the information providing server 4 regularly, for example, once a day, to check if there is update information. More specifically, the collection processor 26 uses an object ID in the collection list table 22 as the key to search for a plurality of collection items to be checked. For each of the plurality of collection items that are searched for, the collection processor 26 asks the information providing server 4 for an information update time in order to acquire individual update data indicating the update time of each collection item (first acquisition step). Next, the update time of each collection item is compared with the table update time 56 stored in the collection list table 22. Information whose update time is later than the update time in the table is judged as un-acquired information. Conversely, information whose update time is earlier than the table update time is judged as already-acquired information. The collection processor 26 acquires un-acquired information as updated latest information (second acquisition step).

A sequence number, rather than an update date/time, may be used in comparison. That is, both an update time and a sequence number are management information that may be used to check which information was updated later. When checking the update time as described above, both the information and the update time nay be acquired at the same time for each collection item, and the comparison described above may be made to save only required information (latest information). When acquiring updated latest information, other information associated with the latest information may also be acquired at the same time (third acquisition step).

For example, information (latest information) provided by the information providing server 4 is encapsulated as an object in this embodiment. The collection processor 26 obtains the capsulated information as an instance. The instance includes, for example, a description that informs the user of upgrading or a description describing where to and how to register a new business rule.

After collecting latest information as described above, the collection processor 26 replaces the table update time 56 stored in the collection list table 22 with the current time or the latest update time. The collection processor 26 also replaces the update time (and sequence number) corresponding to the latest information in the collection list table with the new time.

The delivery processor 28 delivers latest information collected by the collection processor 26 to one or more client terminals 12 associated with the latest information. In this case, the delivery processor 28 references the requested-item list table 20 to identify the client terminals to which the latest information is to be sent. More specifically, the delivery processor 28 checks the requested-item list table 20 to find one or more clients associated with the requested-item corresponding to the collected latest information. For example, if the collected update information is patch information regarding "OS2", the update information is sent to CL2 and CL3 according to the contents of the requested-item list table 20.

Basically, the delivery processor 28 delivers an instance obtained from the information providing server 4 directly to the client terminal 12. If information to be delivered is notification information, the latest information maybe delivered via electronic mail.

The information receiver 32 of the client terminal 12 receives latest information sent from the client terminal management server 14 and executes processing according to the contents of the latest information. For example, if the update information is notification information that will be displayed, the information receiver 32 displays the information or stores it in the storage unit. If the update information is an instance describing processing instructions, the information receiver 32 downloads patch information or new module information from the information providing server 4 or some other server according to the description and includes the downloaded information into the system.

Although the client terminal 12 is connected to the Internet 6 via the client terminal management server 14 in the configuration example in FIG. 1, the client terminal may also be connected, not via the client terminal management server 14, but directly to the Internet.

In the above embodiment, the client terminal management server 14 included in the client system 10 actively collects updated latest information from the information providing server 4. Therefore, the NOC 2 does not have to individually deliver information to the client terminal 12, thus reducing the processing load on the information providing server 4. Nor does the client terminal 12 have to inform the NOC 2 of personal information, preventing personal information leakage. Next, another embodiment will be described.

In the above embodiment, the client terminal management server 14 acquires latest information from the information providing server 4 and automatically delivers the latest information (contents information) to the client terminal 12. In another embodiment, rather than automatically delivering latest information to the client terminal 12, the client terminal 12 itself acquires latest information from the client terminal management server 14.

That is, when information managed by the information providing server 4 is updated, the client terminal management server 14 acquires the updated latest information from the information providing server 4 and saves the acquired information in the storage unit (not shown) in the client terminal management server 14. However, the client terminal management server 14 does not notify one or more client terminals 12 of the fact that the latest information was acquired.

The client terminal 12 accesses the client terminal management server 14 any time the terminal desires. At this time, the terminal references the update time 62 or the sequence number 64 in the collection list table 22 to check if latest information on the terminal is present. In this case, the terminal identifies a collection item or latest information that has been updated since the previous access. Upon recognizing that latest information required for the client terminal 12 is present, the terminal acquires the latest information and executes processing for the latest information. The processing includes the execution of an instance.

In another embodiment described above, the client terminal 12 can acquire latest information any time the terminal desires. Even if environment information is not stored in the requested-item list table 20, the terminal can identify and acquire the update information required for the terminal.

Although the client terminal management server 14 is configured as a dedicated server in the above embodiments, the function of the client terminal management server 14 may be implemented by one or more client terminals 12.

Although an NOC is used as an example of the information provider in the above embodiment, information may be collected also from an information providing server installed in a non-NOC center. In addition, the client terminal management server 14 or the client terminal 12 may acquire not only latest information but also other information associated with the latest information at the same time.

While there have been described what are at present considered to be preferred embodiments of the invention, it will be understood that various modifications may be made thereto, and it is intended that the appended claims cover all such modifications as fall within the true spirit and scope of the invention.

The invention claimed is:

1. An information collection apparatus, comprising:

a collection list table that stores a collection list, the collection list having a plurality of collection items, each collection item being created by combining a plurality of requested items requested by a plurality of client terminals;

a collection processor that actively references a server to check if information corresponding to each collection item in the collection list has been updated, and collects updated latest information corresponding to each collection item, wherein the information collection apparatus is provided between the plurality of client terminals and the server, and the client terminals get the updated latest information corresponding to the requested item from the information collection apparatus;

a requested item list table that stores a plurality of requested item lists, each of the requested item lists being created for each client terminal, each requested item list for the client terminal having the plurality of requested items requested by the client terminals;

a combining processor that combines the requested items based on contents of the requested items and creates the collection items for checking by the collection processor; and a delivery processor that delivers the collected latest information to one or more of the client terminals corresponding thereto based on the requested item list table, wherein the information collection apparatus is an agent server which collects the updated latest information on behalf of the plurality of client terminals;

the requested items identify software and hardware components of the plurality of client terminals; and the updated latest information comprises latest software and hardware updates corresponding to the collection items.

2. The information collection apparatus according to claim 1, wherein the requested item list table is writeable by client terminals and a plurality of requested items sent from the client terminals are stored in the requested item list table as a requested item list.

3. The information collection apparatus according to claim 1, wherein the collection list table further includes table update data that identifies a latest update time of the collection list table, and the collection processor checks if information corresponding to each of said collection items has been updated based on the latest update time.

4. The information collection apparatus according to claim 1, wherein the collection list table further includes, for each of the collection items, individual update data that identifies a latest update time of information corresponding to the collection items.

5. The information collection apparatus according to claim 4 wherein the individual update data for the collection item is referenced from the client terminals.

6. The information collection apparatus according to claim 1, further comprising:

a delivery processor that delivers the updated latest information in response to an acquisition request from the client terminals.

7. The information collection apparatus according to claim 1, wherein the requested items include items regarding hardware and software of the client terminals.

8. The information collection apparatus according to claim 1, wherein the updated latest information is maintenance, new version, or upgrading information regarding hardware and software components or advertisement, promotion, or notification information regarding the hardware or the software components.

9. The information collection apparatus according to claim 1, wherein the client terminals each have a module executing processing for storing the requested item list into the requested item list table.

10. An information collection method executed by an information collection apparatus, comprising:

storing a plurality of requested item lists, each of the requested item lists being created for each of a plurality of client terminals, each requested item list for the client terminal having a plurality of requested items requested by the client terminals;

storing a collection list into a collection list table, the collection list having a plurality of collection items, each collection item being created by combining the plurality of requested items requested by the plurality of client terminals based on contents of the requested items;

actively referencing a server to check if information corresponding to each collection item in the collection list has been updated;

collecting updated latest information corresponding to each collection item; and delivering to respective ones of the plurality of client terminals, or having the respective ones of the client terminals acquire, the latest information, wherein the plurality of client terminals are separate from the information collection apparatus and communicating with the information collection apparatus via a network and the information collection apparatus is an agent server which collects the updated latest information on behalf of the plurality of client terminals;

the requested items identify software and hardware components of the plurality of client terminals; and the updated latest information comprises latest software and hardware updates corresponding to the collection items.

11. An information collection system comprising:

a plurality of client terminals;

a server that stores information; and an information collection apparatus;

the information collection apparatus further comprising:

a collection list table that stores a collection list, the collection list having a plurality of collection items, each collection item being created by combining a plurality of requested items requested by the client terminals, the plurality of requested items identifying software and hardware components of the plurality of client terminals; and a collection processor that actively references the server to check if the information corresponding to each collection item in the collection list has been updated, and collects updated latest information corresponding to each collection item;

a requested item list table that stores a plurality of requested item lists, each of the requested item lists being created for each client terminal, each requested item list for the client terminal having the plurality of requested items requested by the client terminals;

a combining processor that combines the requested items based on contents of the requested items and creates the collection items for checking by the collection processor; and a delivery processor that delivers the collected latest information to one or more of the client terminals corresponding thereto based on the requested item list table, wherein the plurality of client terminals are separate from the information collection apparatus and communicating with the information collection apparatus via a network and the information collection apparatus is an agent server which collects the latest software and hardware updates on behalf of the plurality of client terminals.

12. The information collection system according to claim 11, wherein the client terminals acquire the latest software and hardware updates from the information collection apparatus or the information collection apparatus delivers the latest software and hardware updates to the client terminals automatically.

* * * * *